United States Patent
Berry et al.

(10) Patent No.: US 9,684,751 B2
(45) Date of Patent: *Jun. 20, 2017

(54) SLACK REDISTRIBUTION FOR ADDITIONAL POWER RECOVERY

(71) Applicant: International Business Machines Corporation, Armonk, NY (US)

(72) Inventors: Christopher J. Berry, Hudson, NY (US); Yiu-Hing Chan, Poughkeepsie, NY (US); Arjen A. Mets, Sleepy Hollow, NY (US); Charudhattan Nagarajan, Bangalore (IN); Ricardo H. Nigaglioni, Austin, TX (US); Sourav Saha, Kolkarta (IN); Hameedbasha Shaik, Andhra Pradesh (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,216

(22) Filed: Oct. 9, 2015

(65) Prior Publication Data

US 2017/0046464 A1    Feb. 16, 2017

Related U.S. Application Data

(63) Continuation of application No. 14/824,489, filed on Aug. 12, 2015.

(51) Int. Cl.
*G06F 17/50*  (2006.01)

(52) U.S. Cl.
CPC ...... *G06F 17/5045* (2013.01); *G06F 17/5081* (2013.01); *G06F 17/5031* (2013.01);
(Continued)

(58) Field of Classification Search
CPC ............. G06F 17/5031; G06F 17/5054; G06F 17/5072; G06F 17/5081; G06F 17/5077; G06F 2217/78; G06F 2217/84
(Continued)

(56) References Cited

U.S. PATENT DOCUMENTS

| 6,225,858 | B1 * | 5/2001 | Guardiani ............. G06F 17/505 327/544 |
| 6,272,668 | B1 * | 8/2001 | Teene .................... G06F 17/505 716/113 |

(Continued)

OTHER PUBLICATIONS

List of IBM Patents or Patent Applications Treated as Related; (Appendix P), Filed Oct. 9, 2015; 2 pages.

(Continued)

*Primary Examiner* — Phallaka Kik
(74) *Attorney, Agent, or Firm* — Cantor Colburn LLP; Margaret McNamara

(57) ABSTRACT

A system and method to implement an integrated circuit design are described. The method includes obtaining a timing database of current timing slack values based on current cell selection, placement, and routing for a plurality of cycles defined by a plurality of cycle boundaries, each cycle representing devices between a corresponding pair of the plurality of cycle boundaries, identifying candidate cycle boundaries among the plurality of cycle boundaries for slack redistribution, every one of the candidate cycle boundaries being associated with a positive timing slack, and selecting redistribution cycle boundaries among the candidate cycle boundaries. A modified timing database is generated based on redistributing the positive timing slack associated with the redistribution cycle boundaries, and power recovery is performed using the modified timing database to reduce power at one of more of the redistribution cycle boundaries.

9 Claims, 4 Drawing Sheets

(52) U.S. Cl.
CPC ...... *G06F 17/5054* (2013.01); *G06F 17/5072* (2013.01); *G06F 17/5077* (2013.01); *G06F 2217/78* (2013.01); *G06F 2217/84* (2013.01)

(58) Field of Classification Search
USPC ....... 716/133, 134, 136, 122, 129, 130, 113, 716/109; 703/16
See application file for complete search history.

(56) References Cited

U.S. PATENT DOCUMENTS

| | | | | |
|---|---|---|---|---|
| 6,922,818 | B2* | 7/2005 | Chu | G06F 17/505 716/114 |
| 7,013,438 | B1* | 3/2006 | Saldanha | G06F 17/505 716/104 |
| 7,206,959 | B1* | 4/2007 | Chan | G06F 1/08 713/322 |
| 7,404,163 | B2* | 7/2008 | Chadwick, Jr. | G06F 17/5031 716/113 |
| 7,530,047 | B2* | 5/2009 | Wang | G06F 17/5045 716/109 |
| 7,551,985 | B1* | 6/2009 | Chen | G06F 17/505 700/286 |
| 7,849,422 | B2* | 12/2010 | Sferrazza | G06F 17/505 716/134 |
| 7,921,395 | B2* | 4/2011 | Okumura | G06F 17/5031 703/14 |
| 8,533,649 | B2* | 9/2013 | Tirumala | G06F 17/5031 716/108 |
| 8,552,765 | B2* | 10/2013 | Parthasarathy | H03K 3/0375 327/202 |
| 8,806,410 | B2* | 8/2014 | Kumar | G06F 17/505 716/109 |
| 9,317,641 | B2* | 4/2016 | Chowdhury | G06F 17/505 |
| 9,513,658 | B2* | 12/2016 | Krishnamurthy | G06F 1/10 |
| 2005/0114814 | A1* | 5/2005 | Correale, Jr. | G06F 17/5045 716/113 |
| 2005/0114815 | A1* | 5/2005 | Correale, Jr. | G06F 17/5068 716/133 |
| 2006/0190899 | A1* | 8/2006 | Migatz | G06F 17/5068 716/114 |
| 2007/0033427 | A1* | 2/2007 | Correale, Jr. | G06F 1/3203 713/500 |
| 2007/0226667 | A1* | 9/2007 | Chadwick, Jr. | G06F 17/5031 716/113 |
| 2008/0065923 | A1* | 3/2008 | Arsovski | G06F 1/04 713/400 |
| 2009/0119630 | A1* | 5/2009 | Binder | G06F 17/5031 716/113 |
| 2009/0177424 | A1* | 7/2009 | Pasqualini | G01R 31/3016 702/79 |
| 2010/0299645 | A1* | 11/2010 | Sakurai | G06F 17/5031 716/123 |
| 2011/0093830 | A1* | 4/2011 | Chen | G06F 17/5045 716/132 |
| 2011/0140278 | A1* | 6/2011 | Chen | G03F 1/144 257/773 |
| 2011/0219277 | A1* | 9/2011 | Jen | G06F 17/505 714/726 |
| 2011/0231811 | A1* | 9/2011 | Tang | G06F 17/5036 716/132 |
| 2012/0066658 | A1* | 3/2012 | Chowdhury | G06F 17/505 716/120 |
| 2012/0102448 | A1* | 4/2012 | Haugestuen | G06F 17/5036 716/134 |
| 2012/0159415 | A1* | 6/2012 | Hannan | G06F 17/5031 716/113 |
| 2012/0221995 | A1* | 8/2012 | Zahn | G06F 17/505 716/134 |
| 2013/0080990 | A1* | 3/2013 | Singh | G06F 17/5045 716/133 |
| 2014/0165022 | A1* | 6/2014 | Stevens | G06F 17/5031 716/134 |
| 2015/0015306 | A1* | 1/2015 | Jarrar | H03K 19/094 326/102 |
| 2015/0234949 | A1* | 8/2015 | Chakrabarti | G06F 17/5081 716/104 |
| 2015/0248519 | A1* | 9/2015 | Verma | G06F 17/5081 716/113 |
| 2016/0266604 | A1* | 9/2016 | Krishnamurthy | G06F 1/10 |

OTHER PUBLICATIONS

Christopher J. Berry et al., "Slack Redistribution for Additional Power Recovery", U.S. Appl. No. 14/824,489, filed Aug. 12, 2015.

* cited by examiner

US 9,684,751 B2

SLACK REDISTRIBUTION FOR ADDITIONAL POWER RECOVERY

This application is a continuation of U.S. application Ser. No. 14/824,489 filed Aug. 12, 2015, the disclosure of which is incorporated herein by reference in its entirety.

BACKGROUND

The present invention relates to slack reduction, and more specifically, to slack redistribution for additional power recovery.

In computer-aided design (CAD) of system-on-chip (SoC) designs of integrated circuits (chips), a logical or circuit design is converted to a physical realization through processes that include synthesis, placement, and routing. As part of the synthesis process, technology-independent logic synthesis is converted to technology mapping with standard cell library elements. A cell is a component placed within the chip. The technology mapping (synthesis) phase, as well as the placement and routing of the selected components, may be done iteratively to ensure that timing and other design constrains are met.

SUMMARY

According to one embodiment of the present invention, a method of implementing an integrated circuit design includes obtaining a timing database of current timing slack values based on current cell selection, placement, and routing for a plurality of cycles defined by a plurality of cycle boundaries, each cycle representing devices between a corresponding pair of the plurality of cycle boundaries; identifying candidate cycle boundaries among the plurality of cycle boundaries for slack redistribution, every one of the candidate cycle boundaries being associated with a positive timing slack; selecting redistribution cycle boundaries among the candidate cycle boundaries; generating, using a processor, a modified timing database based on redistributing the positive timing slack associated with the redistribution cycle boundaries; and performing, using the processor, power recovery using the modified timing database to reduce power at one of more of the redistribution cycle boundaries.

According to another embodiment, a system to implement an integrated circuit design includes a memory configured to store a timing database of current timing slack values based on current cell selection, placement, and routing for a plurality of cycles defined by a plurality of cycle boundaries, each cycle representing devices between a corresponding pair of the plurality of cycle boundaries; and a processor configured to identify candidate cycle boundaries among the plurality of cycle boundaries for slack redistribution, every one of the candidate cycle boundaries being associated with a positive timing slack, to select redistribution cycle boundaries among the candidate cycle boundaries, to generate a modified timing database based on redistributing the positive timing slack associated with the redistribution cycle boundaries, and to perform power recovery using the modified timing database to reduce power at one of more of the redistribution cycle boundaries.

According to yet another embodiment, a computer program product for performing a physical implementation of an integrated circuit design includes a computer readable storage medium having program instructions embodied therewith, the program instructions executable by a processor to perform a method. The method includes obtaining a timing database of current timing slack values based on current cell selection, placement, and routing for a plurality of cycles defined by a plurality of cycle boundaries, each cycle representing devices between a corresponding pair of the plurality of cycle boundaries; identifying candidate cycle boundaries among the plurality of cycle boundaries for slack redistribution, every one of the candidate cycle boundaries being associated with a positive timing slack; selecting redistribution cycle boundaries among the candidate cycle boundaries; generating a modified timing database based on redistributing the positive timing slack associated with the redistribution cycle boundaries; and performing power recovery using the modified timing database to reduce power at one of more of the redistribution cycle boundaries.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, one of the phases of chip design involves synthesis or selecting components (e.g., standard cells from a library) to implement each portion of the logical design. This is generally followed by placing the components (arranging them relative to each other on the chip) and routing the components (connecting components) to ensure that processes are completed within the required time constraints. A number of components make up a device, and the chip is made up of a number of devices. The selection of the components and their placement and routing includes ensuring that timing constraints of the logical design are met. That is, much of the processing done on the chip is sequential processing such that delays in one portion can result in overall performance degradation. When the timing requirements are exceeded (the component is faster than required), the excess time is referred to as timing slack or positive timing slack (since timing deficiency may be called negative timing slack). Timing and power are related because faster processing typically requires more power. Accordingly, when a device exhibits timing slack (the device is faster than necessary), the device also has power slack (the device is drawing more power than necessary). Thus, if timing slack is reduced, then power slack is also reduced, and reducing power consumption is generally desirable. Existing design systems perform power recovery, which involves lowering drive strength or using higher threshold voltage devices when drive strength and threshold voltage are determined to be more than required to meet (timing) performance targets. These current systems address slack margin between two adjacent cycle boundaries (where a cycle is between two latch boundaries). In a technique known as cycle stealing, for example, positive slack from one cycle is borrowed to meet the timing requirement in a previous cycle. Embodiments of the methods and systems described herein relate to redistribution of slack across multiple cycle boundaries prior to a power recovery process to further reduce timing slack and, consequently, power usage.

Figure 1:
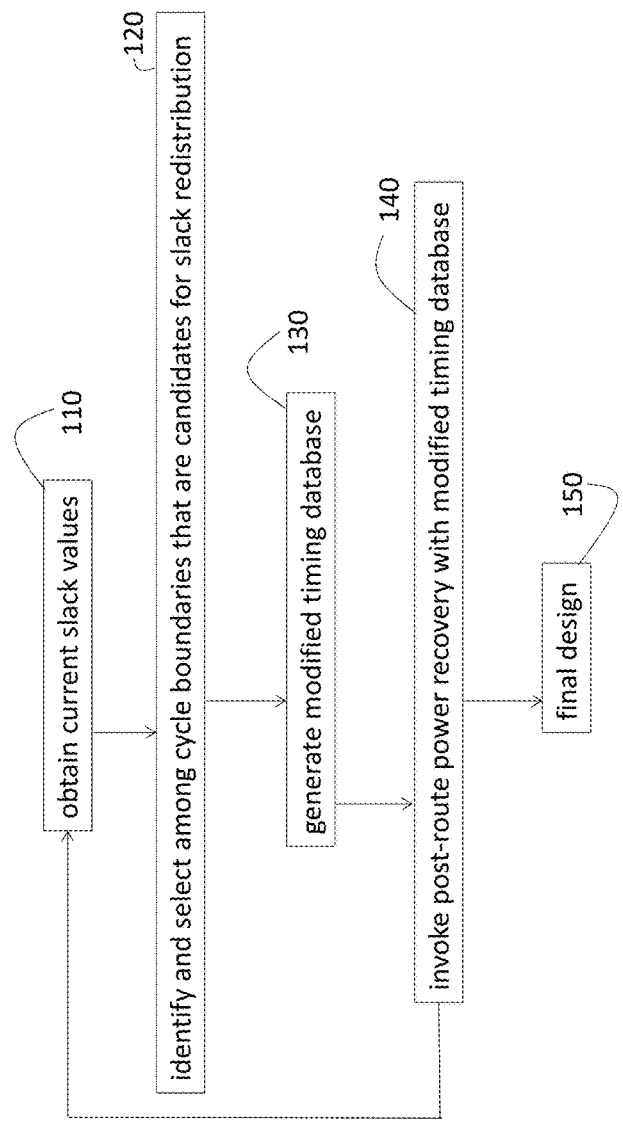
FIG. 1 is a process flow of a method of performing the physical synthesis process according to embodiments.

FIG. 1 is a process flow of a method of performing the physical synthesis process according to embodiments. At block 110, obtaining current slack values in each of the devices over multiple cycles includes performing a place and route process with the current cell selections. These current slack values are included in a timing database. Identifying and selecting among cycle boundaries (latches) that are candidates for slack redistribution or transfer, at block 120, is further detailed with reference to FIGS. 2 and 3. Two or more continuous cycle boundaries (i.e., each adjacent to the next), all with positive slack may be identified as candidates. Several factors, discussed below, may be used to determine which candidate cycles to redistribute slack over. At block 130, generating a modified timing database includes redistributing slack among the identified and selected cycle boundaries to change the timing slack in the timing database associated with some of the cycle boundaries. Invoking post-route power recovery with the modified timing database, at block 140, includes performing the known power recovery process (used in cycle stealing) but with the modified timing database resulting from redistributed slack according to embodiments detailed herein. As FIG. 1 indicates, processes 110 through 140 may be performed iteratively before finalizing design at block 150. In addition, different iterations may be performed at different hierarchical levels of the design. That is, during one iteration performed at a given stage of design, three cycles may be considered at a time for redistribution while, during another iteration, two cycles may be considered for redistribution at a time.

Figure 2:
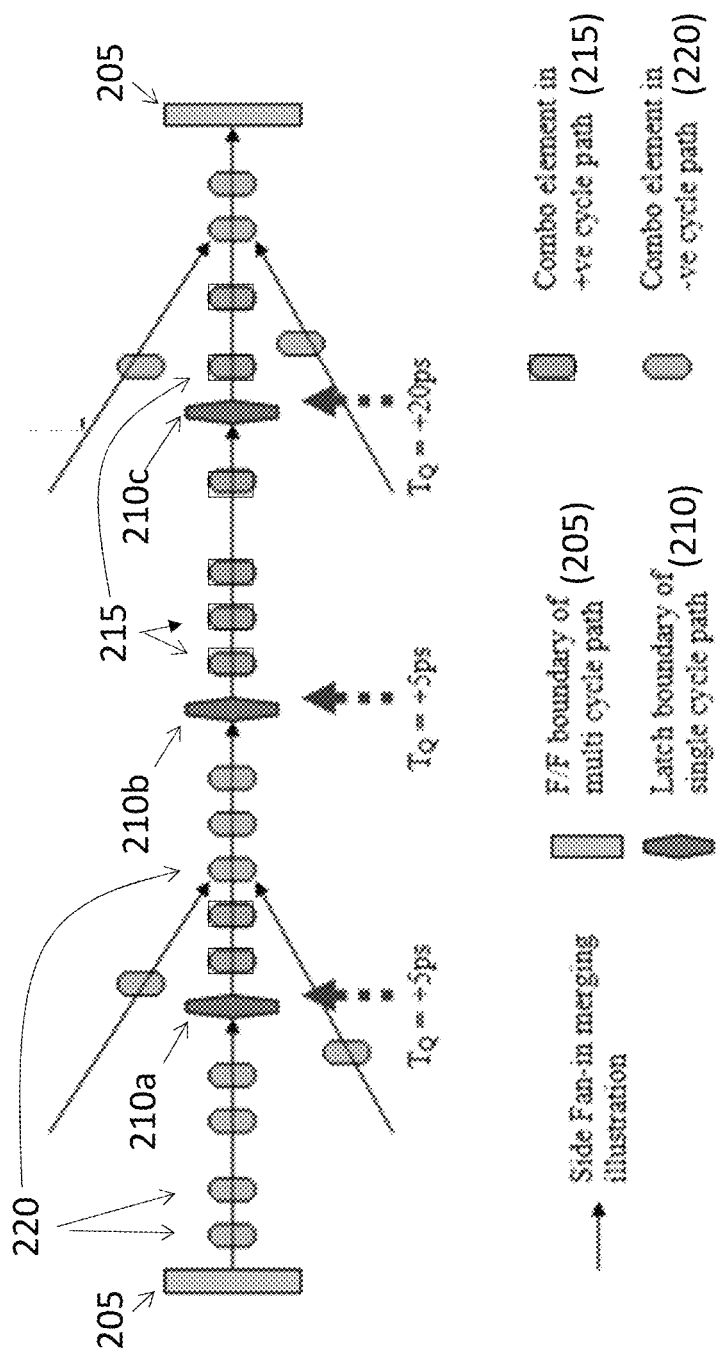
FIG. 2 illustrates exemplary candidate cycles for slack redistribution according to embodiments.

FIG. 2 illustrates exemplary candidate cycles for slack redistribution according to embodiments detailed herein. FIG. 2 shows multi cycle paths between a pair of flip flops (F/F) 205. FIG. 2 indicates three latch boundaries 210a through 210c of single cycle paths. The latch-based design (versus a register-based design, for example) facilitates slack redistribution and time borrowing (cycle stealing) across cycles. The cycle stealing is done by time shifting the arrival time of clocks that feed the latches. The associated timing slack ($T_Q$) of each of the latch boundaries 210a, 210b, 210c is +5 picoseconds (ps), +5 ps, and +20 ps, respectively. As FIG. 2 illustrates, each single cycle path may include both elements with positive slack 215 and elements with negative slack 220. The combination of the timing of the elements results in the timing of the cycle. In a conventional slack stealing (power recovery) process, a cycle with +20 ps may be used to improve timing of a previous cycle with −5 ps, for example. However, when determining candidate cycles for slack distribution (prior to power recovery), all the candidate cycles must have positive slack, as in the example shown in FIG. 2. While specific slack values are shown in FIG. 2 for exemplary purposes, the example is not intended to limit the slack redistribution to any specific slack values.

Figure 3:
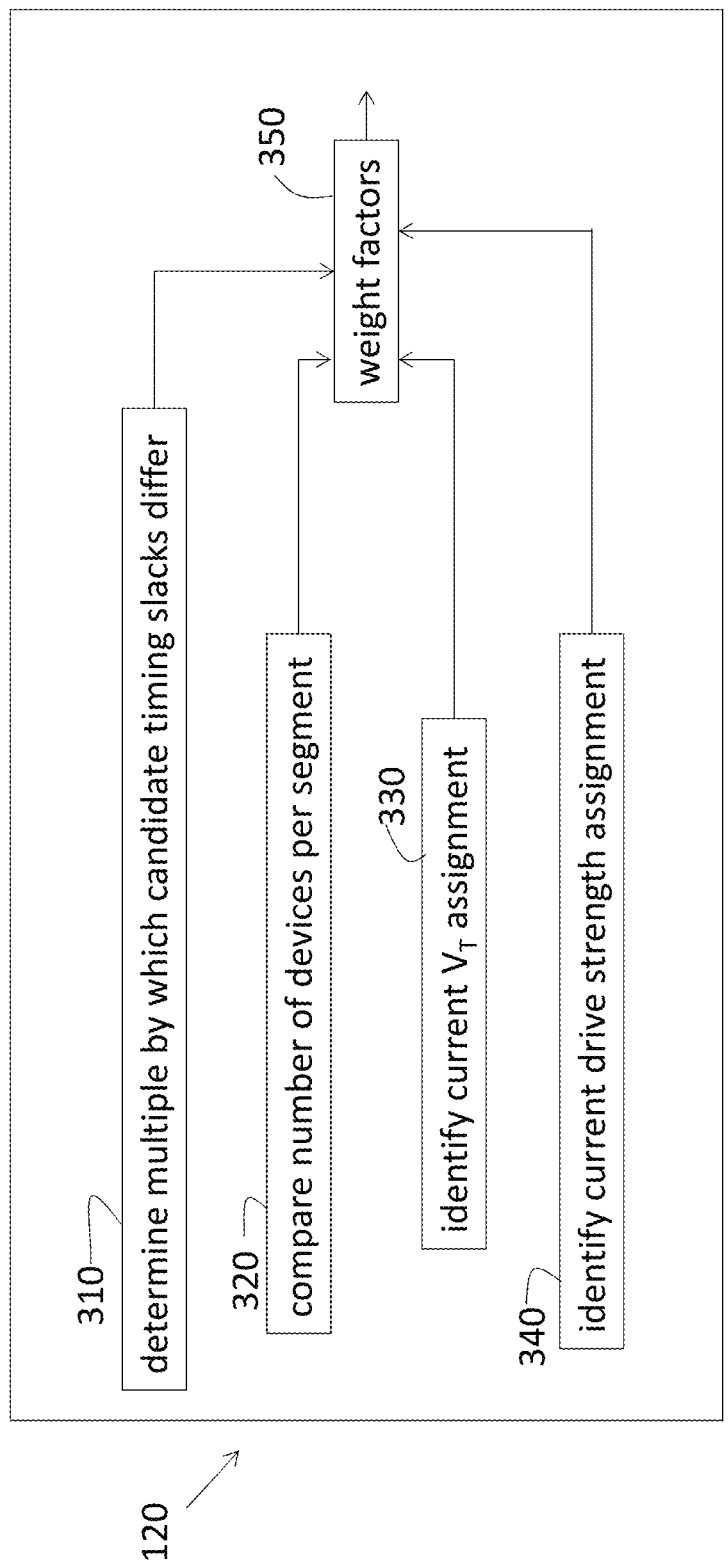
FIG. 3 details the process of selecting among cycle boundaries that are candidates for slack transfer according to an embodiment.

FIG. 3 details the process of selecting among cycle boundaries that are candidates for slack transfer at block 120 (FIG. 1) according to an embodiment. Blocks 310 through 340 detail factors that are considered and weighted, at block 350, to determine the candidate cycles over which to perform slack redistribution prior to power recovery. At block 310, one factor includes determining the multiple or factor by which candidate cycles' timing slacks differ. For example, as shown in FIG. 2, the candidate cycles associated with the latch boundaries 210a, 210b, 210c have timing slacks of +5 ps, +5 ps, and +20 ps, respectively. Thus, a factor of 4 separates the +5 ps timing slack and the +20 ps timing slack values. If, on the other hand, the timing slack of another pair of candidate cycles were +5 ps and +13 ps, the timing slack values are separated by a non-integer factor less than 3. In the exemplary case of comparing these two sets of candidate cycles, the cycles with +5 ps and +20 ps slack would be selected for redistribution. That is, the higher the multiple or factor by which positive timing slack differs between candidate cycles, the better the candidate cycles are (the more likely they will be selected) for redistribution.

At block 320, another factor considered to select among candidate cycles for redistribution includes comparing the number of devices per segment. That is, path depth and logic depth are considered. Each cycle is associated with a segment that includes a number of devices. If one segment has 20 devices and another segment has 5 devices, the segment with 20 devices is a better candidate for slack redistribution, because a higher device count represents a higher chance for additional power reduction. At block 330, identifying the current threshold voltage ($V_T$) assignment provides another factor for consideration in determining which candidate cycles should be selected for slack redistribution. Generally, one of two to four different $V_T$ values may be assigned to devices on a chip. When the $V_T$ currently assigned is the lowest among the available $V_T$ values, there is no room for movement (to reduce power usage) whereas, when the currently assigned $V_T$ is the highest among the available $V_T$ values, $V_T$ may be reduced, thereby reducing power and timing slack. At block 340, identifying current drive strength assignment, like identifying current $V_T$ assignment at block 340, facilitates a determination of the room available for movement and, thus, for redistribution. Drive strength relates to the device (standard cell) size selection from the standard cell library. A smaller drive strength drives a smaller load but draws less current (less power consumption). However, when a segment has devices that are near the minimum drive strength within an acceptable range for operation, the associated cycle may be a poor candidate for slack redistribution. On the contrary, when devices are near the maximum drive strength, the associated cycle may be a good candidate to select for slack redistribution.

Each of the considerations at blocks 310 through 340 may be scored and weighted (at block 350) in order to determine which candidate cycles to perform redistribution over in order to generate the modified timing database (at block 130, FIG. 1). The specific mechanism of redistribution (how the modified timing database is generated at block 130) may be selected from a look-up-table, for example. That is, $V_T$ or drive strength may be increased or reduced, for example, to increase slack in one cycle and reduce slack in another. For example, beginning with candidate cycles with associated timing slack of +5 ps and +20 ps, the redistribution of slack may result in timing slack of +10 ps and +15 ps. As a result of this redistribution, the known power recovery after cycle stealing (at block 140, FIG. 1) may reduce power usage by more (than without the redistribution) across the entire design.

Figure 4:
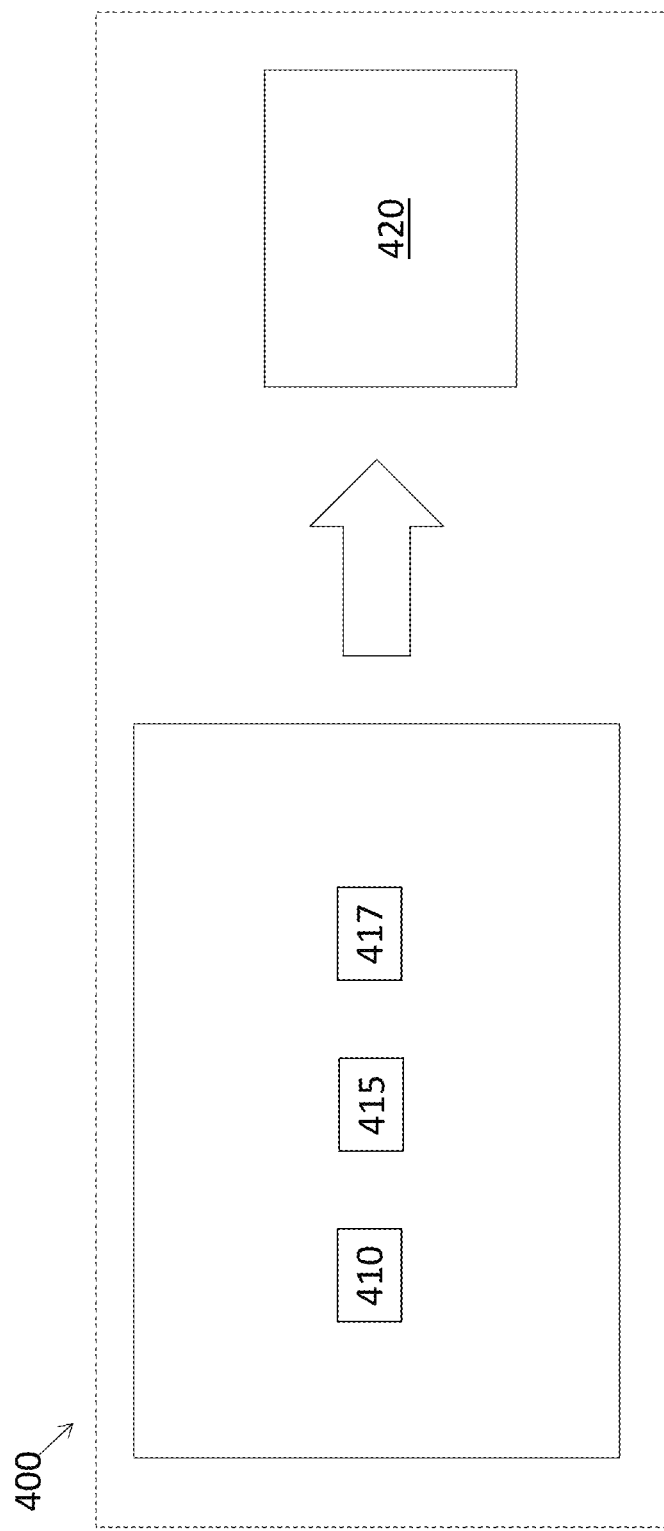
FIG. 4 is a block diagram of a system to generate a physical implementation of a logical design according to embodiments.

FIG. 4 is a block diagram of a system to generate a physical implementation (chip 420) of a logical design according to embodiments discussed herein. The system 400 includes one or more memory devices 410 and one or more processors 415. The memory device 410 may store the standard cell library and instructions for performing the synthesis and place and route, for example. An interface 417 may facilitate obtaining some of that information from another system wirelessly, for example. The interface 417 may additionally facilitate access to information stored in an external memory device rather than memory device 410. Other known components of SoC design and implementation are not detailed herein. The memory device 410 may also store the rules and weighting factors associated with selecting candidate cycles for redistribution, as described above. The processor 415 may perform the processes shown in FIG. 1 associated with developing the physical implementation (chip 420).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of implementing an integrated circuit design, the method comprising:
    obtaining a timing database of current timing slack values based on current cell selection, placement, and routing for a plurality of cycles defined by a plurality of cycle boundaries, each cycle representing devices between a corresponding pair of the plurality of cycle boundaries;
    identifying candidate cycle boundaries among the plurality of cycle boundaries for slack redistribution, every one of the candidate cycle boundaries being associated with a positive timing slack;
    selecting redistribution cycle boundaries among the candidate cycle boundaries;
    generating, using a processor, a modified timing database based on redistributing the positive timing slack associated with the redistribution cycle boundaries; and
    performing, using the processor, power recovery using the modified timing database to reduce power at one of more of the redistribution cycle boundaries; and
    generating a physical implementation of the integrated circuit design resulting from the power recovery using the modified timing database.

2. The method according to claim 1, wherein the identifying the candidate cycle boundaries includes identifying two or more adjacent ones of the plurality of cycle boundaries with the positive timing slack.

3. The method according to claim 1, wherein the selecting the redistribution cycle boundaries includes considering two or more factors.

4. The method according to claim 3, wherein the considering the two or more factors includes considering a multiple by which the positive timing slack of adjacent ones of the candidate cycle boundaries differ.

5. The method according to claim 3, wherein the considering the two or more factors includes considering a number of devices associated with each of the candidate cycle boundaries.

6. The method according to claim 3, wherein the considering the two or more factors includes considering a threshold voltage, among a set of threshold voltage, that is associated with each of the candidate cycle boundaries.

7. The method according to claim 3, wherein the considering the two or more factors includes considering a drive strength associated with each of the candidate cycle boundaries.

8. The method according to claim 3, wherein the selecting the redistribution cycle boundaries includes weighting each of the two or more factors.

9. The method according to claim 1, wherein the obtaining the timing database, the identifying the candidate cycle boundaries, the selecting the redistribution cycle boundaries, the generating the modified timing database, and the performing the power recovery using the modified timing database are performed iteratively at different hierarchies of the integrated circuit design.

* * * * *